Feb. 20, 1968     E. J. WHELAN, JR     3,369,807

RECIPROCATING FEED MECHANISM

Filed May 20, 1966     6 Sheets-Sheet 1

INVENTOR.
EDWARD J. WHELAN, JR.
BY
ATTORNEYS

Feb. 20, 1968     E. J. WHELAN, JR     3,369,807
RECIPROCATING FEED MECHANISM
Filed May 20, 1966                                          6 Sheets-Sheet 4

INVENTOR
EDWARD J. WHELAN, JR.

BY

ATTORNEYS

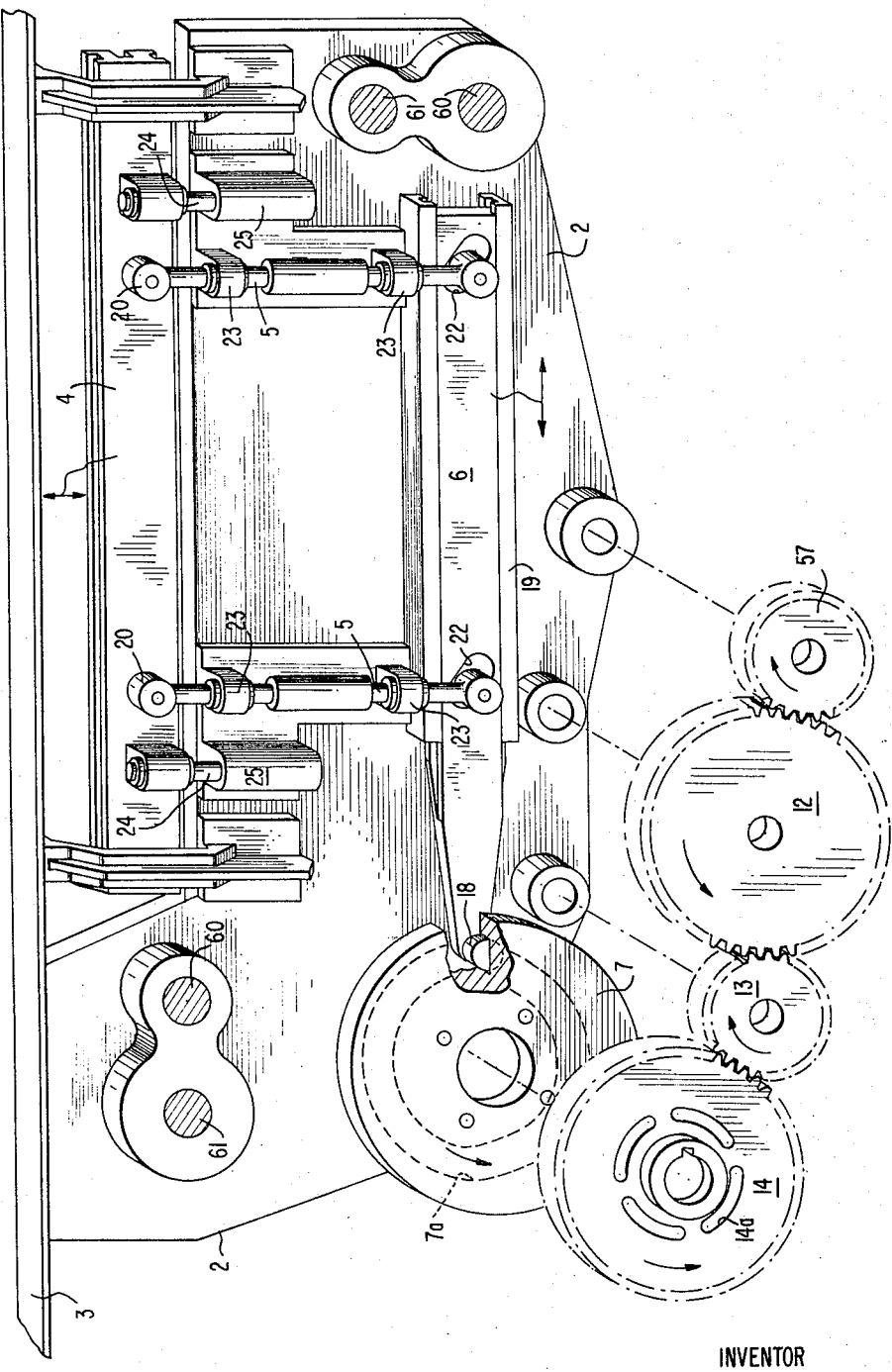

INVENTOR.
EDWARD J. WHELAN, JR.
BY
ATTORNEYS

United States Patent Office 3,369,807
Patented Feb. 20, 1968

3,369,807
RECIPROCATING FEED MECHANISM
Edward J. Whelan, Jr., Hasbrouck Heights, N.J., assignor to Sun Chemical Corporation, New York, N.Y., a corporation of Delaware
Filed May 20, 1966, Ser. No. 551,726
7 Claims. (Cl. 271—69)

This invention relates to conveyor assemblies, and more particularly, to a conveyor assembly for delivering metallic sheets into a metal decorating press.

The conveyor assembly of the present invention is an improvement of the feeding mechanism disclosed in U.S. Patent No. 2,986,393, dated May 30, 1961, and assigned to the same assignee as the instant application. The feeding mechanism described and claimed in the above-identified patent comprises, essentially, a pair of sprocket-driven endless chains mounted on either side of a feed table, said chains having pusher lugs adapted to engage the trailing end of a sheet and move it in the direction of a printing cylinder; and a pair of chain-driven, reciprocatory carriages, each of the carriages having pusher lugs adapted for engagement with the rear end of the sheet, whereby the trailing edge of each sheet being fed to the decorating press is first engaged by the chain pusher lugs and driven a predetermined distance, whereupon the carriage lugs engage the trailing edge of the sheet and moves it the remaining distance to the decorating press, at a predetermined velocity corresponding to the peripheral speed of the cylinder of the decorating press. Reciprocating movement is imparted to each of the carriages by means of a roller operatively connected between the carriage and the drive chain associated therewith; a pusher lug is mounted on the carriage and connected to the roller through a suitable linkage, whereby the pusher lug is projected into operative engagement with the trailing edge of a sheet when the carriage is moving toward the decorating press, but is retracted to the inoperative position when the carriage is moving away from the decorating press, preparatory to engaging the trailing edge of a succeeding sheet.

It will be appreciated that with feed mechanisms for delivering metallic sheets at relatively high speeds into a metal decorating press, it is essential that the sheets be fed into the press at a velocity corresponding to the peripheral speed of the press cylinder. In the sheet feeding arrangement of the above-noted patent, the carriage for delivering the sheets into the press is operatively connected to a plurality of sprocket-driven endless chains. While drive means of this type function satisfactorily within certain limits, it has been found that at relatively high speeds, the chains have a tendency to pulsate and elongate, thus causing a variation in the linear velocity of the carriage; consequently, the sheets are not fed into the press at a uniform velocity corresponding to the peripheral velocity of the press cylinder. Furthermore, in view of the fact that the carriage is reciprocated in a horizontal plane by means of a sprocket-driven chain, extensive linkage must be provided to retract the carriage pusher lugs to inoperative position during the return stroke of the carriage, in order that a succeeding sheet may be fed to a position to be engaged by the carriage lugs during its forward stroke.

After considerable research and experimentation, I have found that the above-noted disadvantages incident to driving the carriages by chain means can be overcome by employing an improved direct drive mechanism, in lieu of chains, in combination with novel mechanism adapted to provide control, as desired, of the linear velocity of the carriages during forward and reverse movement thereof, whereby the sheets to be decorated are fed into the press at a uniform linear velocity corresponding to the peripheral velocity of the press cylinder.

The conveyor assembly of the present invention comprises, essentially, a feed table having a pair of sprocket-driven endless chains mounted on either side thereof, said chains having pusher lugs adapted to engage the trailing edge of a sheet for conveying the sheet to a pair of carriages having pusher lugs associated therewith. The carriages are slidably mounted on track means carried by the table in proximity to the endless chains, and reciprocatory movement is imparted to each carriage by a lever operatively connected to a slide crank mechanism, said lever also being connected to cam means mounted on the feed table, whereby the linear velocity of the reciprocating carriage may be controlled. Riser cam and riser arm means are operatively connected to the carriage track means for moving the track in a vertical plane during the reciprocatory movement of the carriages. By means of this construction and arrangement, the track is elevated during the forward travel of the carriages to permit the carriage pusher lugs to engage the trailing edge of a sheet being fed to the decorating press, and is lowered during the return stroke of the carriage to allow the carriage pusher lugs to clear the next succeeding sheet being conveyed into position by the endless chain lugs, preparatory to being engaged by the carriage pusher lugs.

An object of the invention is to provide an improved conveyor assembly.

Another object of the invention is to provide an improved conveyor assembly incorporating a reciprocatory work-moving carriage, wherein the carriage is reciprocated by means of direct drive mechanism operatively associated therewith; and velocity control means is provided, whereby the linear velocity of the work-moving carriage may be controlled, as desired.

Yet another object of the invention is to provide an improved conveyor assembly incorporating reciprocatory carriage means for delivering metallic sheets into a metal decorating machine, wherein the carriage means is reciprocated by direct drive mechanism operatively associated therewith; and velocity control mechanism is provided for controlling the linear velocity of the carriage means, as desired, whereby the metallic sheets to be decorated are fed into the press at a uniform linear velocity corresponding to the peripheral velocity of the press cylinder.

Still another object of the invention is to provide an improved conveyor assembly incorporating a reciprocatory, work-moving carriage, wherein a slide-crank mechanism is operatively connected between cam means and the work-moving carriage, whereby the velocity of the work-moving carriage may be controlled.

A further object of the invention is to provide an improved conveyor assembly having a reciprocating work-moving carriage slidably mounted on track means connected to riser cam and arm means for moving the track means in a vertical plane during the reciprocatory movement of the carriage, whereby the track means is in an elevated position during the forward travel of the carriage and lowered during the return stroke of the carriage.

A still further object of the invention is to provide an improved conveyor assembly for delivering metallic sheets into a metal decorating press wherein a pair of sprocket-driven endless chains, carrying pusher lugs, are mounted on either side of a feed table for conveying a sheet to a pair of velocity-controlled reciprocating carriages slidably mounted on track means adapted to be reciprocated in a vertical plane.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 5 is a perspective view of the riser cam and arm means employed for moving the carriage track in a vertical plane.

Figure 1:
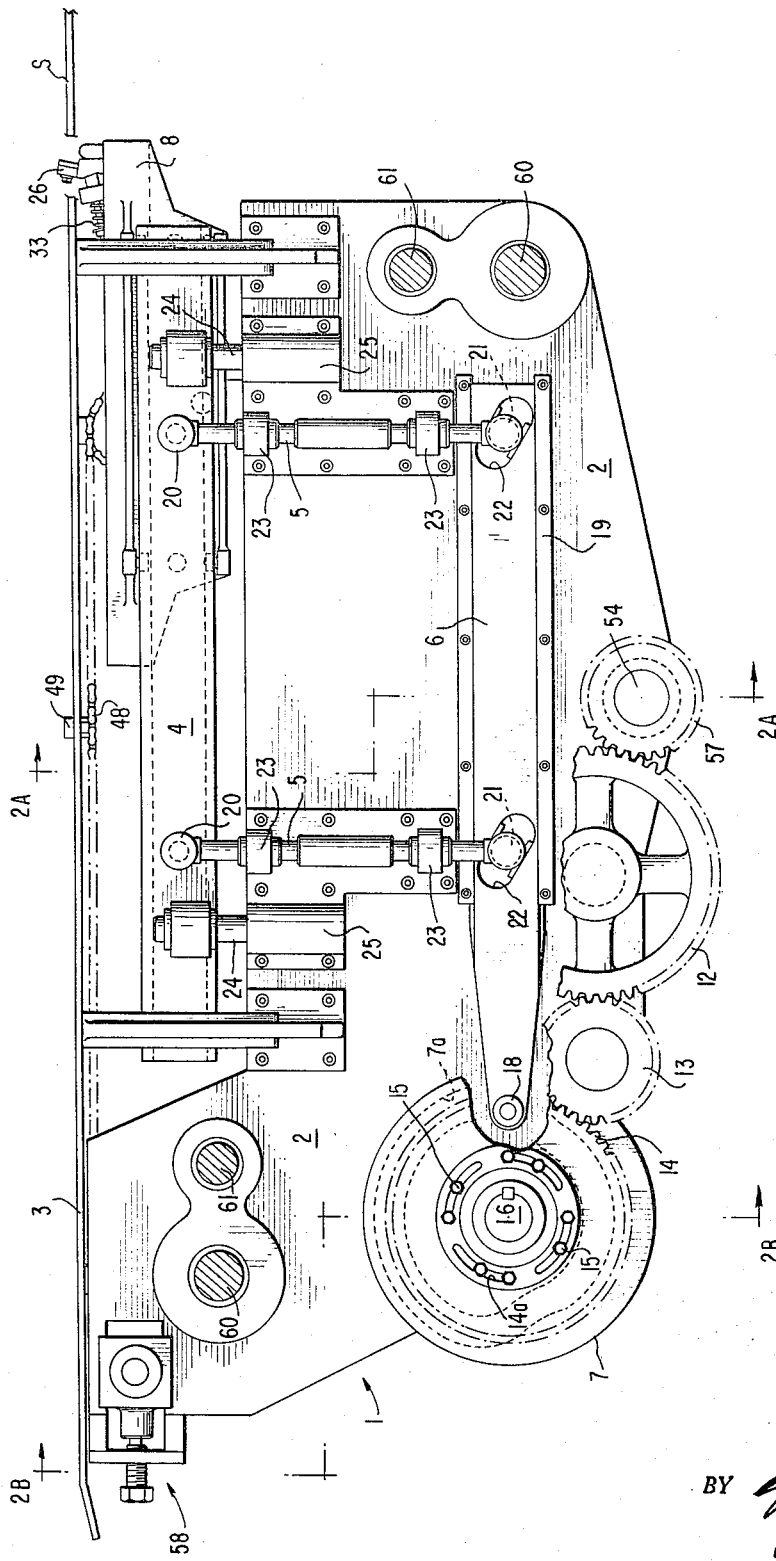
FIGURE 1 is a side elevational view of the conveyor assembly of the present invention.

Referring to the drawings and more particularly to FIGURES 1, 2A, 2B and 3, the conveyor assembly of the present invention comprises, essentially, a feed table 1 having a pair of vertically extending frame members 2, disposed on opposite sides thereof. Each of the frames provides support for a pair of spaced parallel, longitudinally extending sheet supporting slats 3 and a trackway 4, adapted to be moved in a vertical plane, relative to the frame, by means of connecting rods 5 having their upper ends connected to the trackway and their lower ends connected to a riser arm 6 which in turn is connected to a riser cam 7, to be described more fully hereinafter. A velocity-controlled, reciprocatory, work-moving carriage 8 is slidably mounted on each of the tracks 4, reciprocating movement being imparted to each carriage 8 through a lever 9 operatively connected between the carriage, a cam plate 10, and a slide-crank mechanism 11, as will also be described hereinafter.

Figure 2:
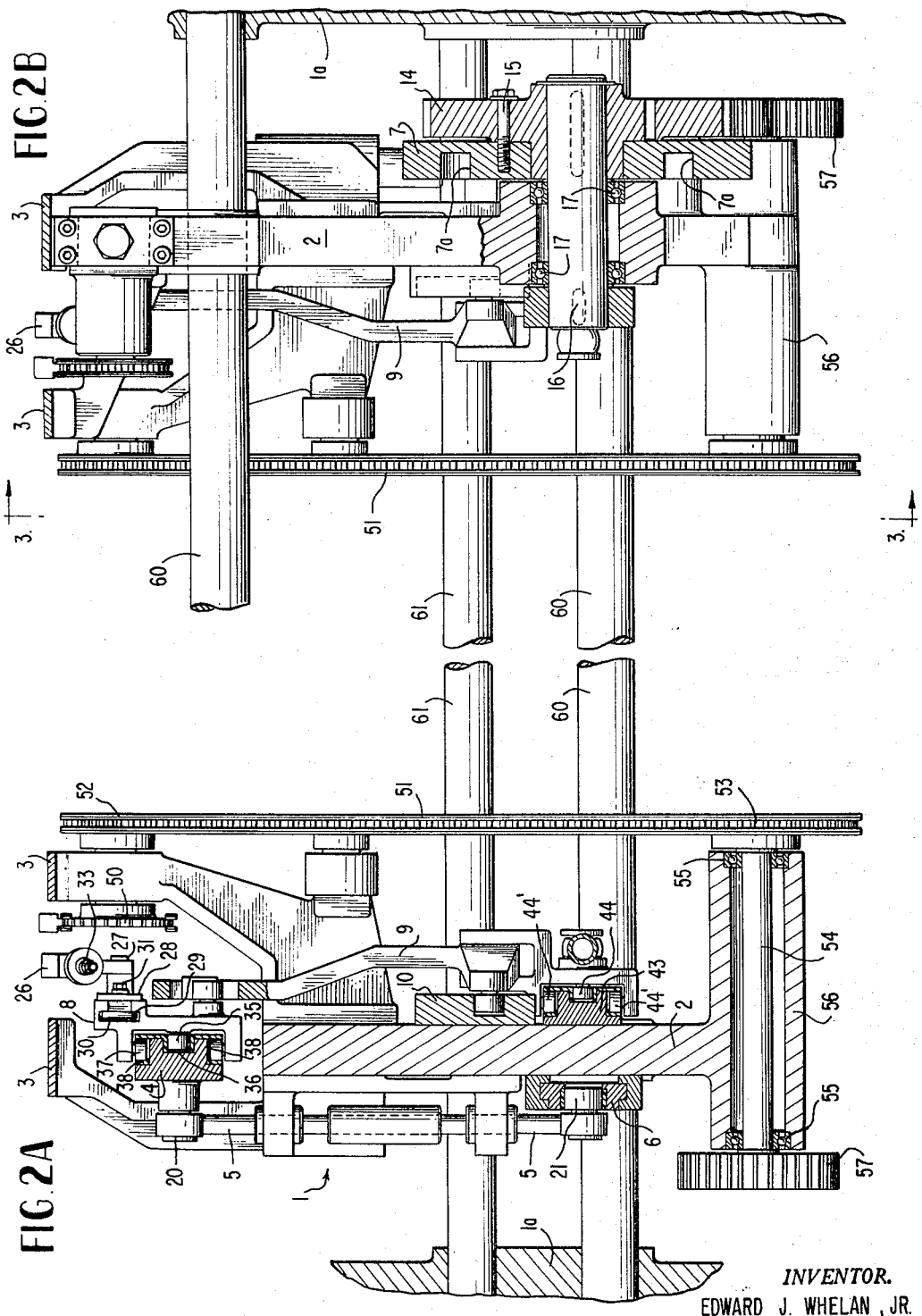
FIGURE 2A is a view along line 2A—2A of FIGURE 1.
FIGURE 2B is a view along line 2B—2B of FIGURE 1.

Referring to FIGURE 2A, the rods 5, riser arm 6, and riser cam 7, employed for actuating each track 4 are secured to one side of the frame 2, and the lever 9, cam plate 10, and slide crank mechanism 11 for imparting the reciprocatory movement to the carriage 8, are mounted on the opposite side of said frame. In view of the fact that the conveyor assembly on one side of the feed table, which conveyor assembly, including frame 2, track 4, and carriage 8, together with their respective operating mechanisms, is identical in all respects to the conveyor assembly on the opposite side of the feed table, only one of the assemblies will be described in detail.

As will be seen in FIGURES 1 and 5, a main drive gear 12 meshes with a pinion gear 13 which, in turn, drives a gear 14 having the riser cam 7 secured to one face thereof. The riser cam is adjustably mounted on the face of gear 14 by means of bolts 15 extending through a plurality of circumferentially spaced arcuate slots 14a formed in the gear, the gear 14 and associated riser cam 7 being rotatably mounted on the frame by means of a stub shaft 16 journaled in the frame by means of suitable bearings 17, FIGURE 2B. One face of the riser cam is provided with an eccentrically disposed, suitably contoured groove 7a which accommodates a roller 18 connected to one end of the riser arm 6, which arm is slidably mounted in a track 19 secured to frame 2.

By means of the construction and arrangement of the riser arm 6 and riser cam 7, it will be readily apparent that rotation of the cam will cause reciprocation of the arm as indicated by the arrows in FIGURE 5, the length of stroke of the arm being determined by the distance of the cam groove from the center of rotation of the cam; thus, as the portion of the cam groove furthest from the center of rotation approaches the roller 18, the arm is pushed to one end of its stroke, and as the portion of the cam groove closest to the center of rotation approaches the roller, the arm is pulled in the opposite direction.

The above-described horizontal, reciprocating movement of arm 6 is translated into a vertical, reciprocating movement to carriage track 4, as indicated by the arrows in FIGURE 5, by means of the rods 5 having their upper ends secured to the carriage track as at 20 and their lower ends connected to arm 6 through roller pins 21 (FIGURE 2A) mounted within inclined slots 22 formed in the arm. Accordingly, by this construction and arrangement, as the riser arm 6 is reciprocated by the riser cam 7, the lower ends of rods 5 will ride in the inclined slots 22; thus, as arm 6 is pushed to the right as viewed in FIGURE 5, the inclined surfaces of slots 22 will push the ends of rods 5 upwardly to thereby elevate the carriage track 4. When the arm is pulled to the left, the lower ends of rods 5 ride downwardly on the inclined surfaces of slots 22 thereby moving the carriage track to its retracted position. In order to facilitate the vertical, reciprocatory movement of the carriage track, the rods 5 are slidably mounted in suitable slide bearings 23 secured to the carriage track which is also provided with guide pins 24 slidably mounted in similar slide bearings 25 secured to the frame.

Figure 3:
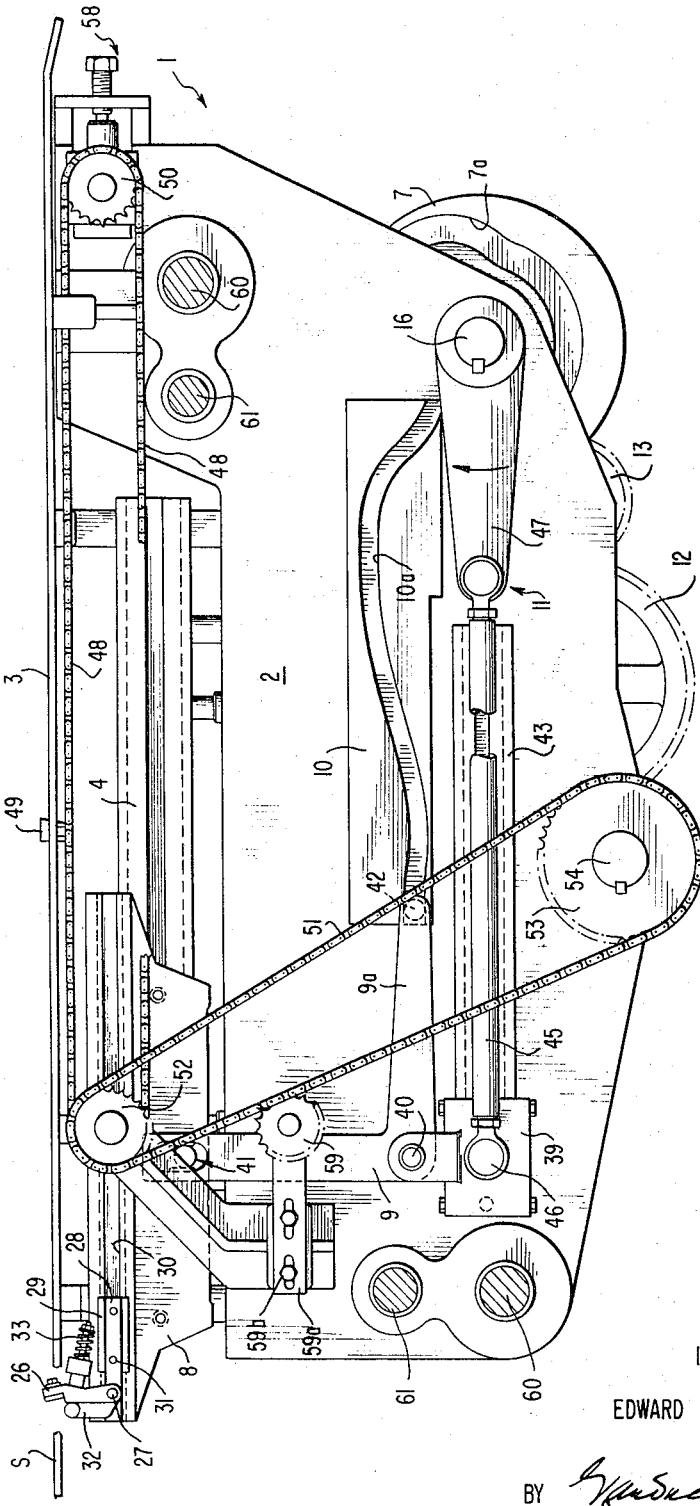
FIGURE 3 is a side elevational view taken along line 3—3 of FIGURE 2B.
Figure 4:
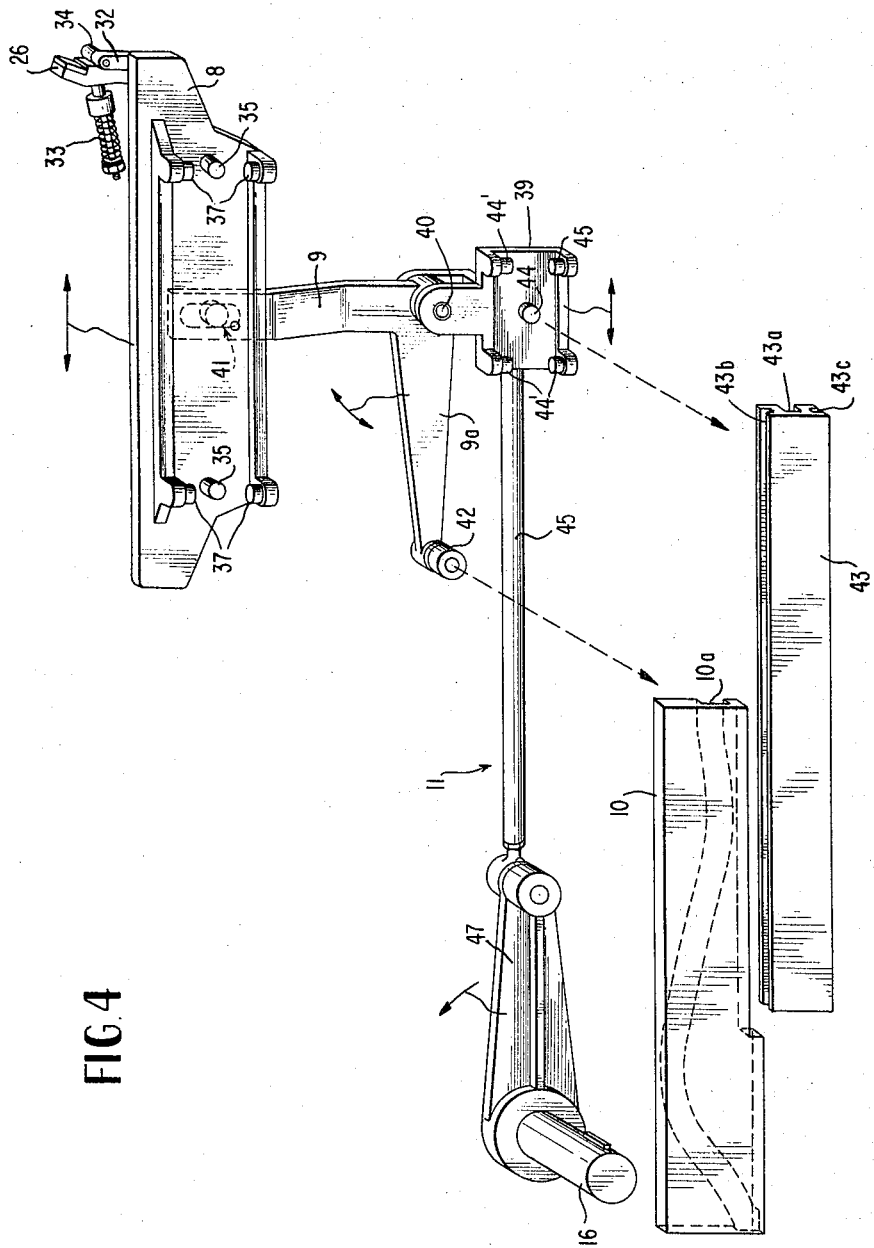
FIGURE 4 is an exploded view of the velocity-controlled slide crank mechanism and associated work-moving carriage.

Referring to FIGURES 2A, 3 and 4, the velocity-controlled reciprocating work-moving carriage 8 is provided with a pusher lug 26 pivotally mounted as at 27 to the side of a plate 28 secured to a block 29 (FIGURE 2A) which is slidably mounted in a longitudinally extending channel-shaped groove 30 formed in the side of the carriage. Suitable bolts 31 extend through the plate 28 and block 29 for clamping the plate and block against the sides of groove 30, whereby the pusher lug may be moved to a predetermined position on the carriage and clamped in the adjusted position by tightening bolts 31. The pusher lug abuts a stop member 32, secured to the plate 28, the lug being biased against the stop member by means of a compression spring 33 mounted on a draw bar assembly 34 having one end secured to the stop member. The compression spring provides the pusher lug with sufficient resiliency, when the lug engages the trailing edge of the sheet being conveyed, to prevent buckling of the sheet when it is moved into engagement with the press cylinder.

As will be seen in FIGURES 2A and 4, the carriage is slidably mounted on the track 4 by means of a pair of rollers 35 secured to the side of the carriage and adapted to roll in a longitudinally extending groove 36 formed in the side of the track 4, movement of the carriage on the track being stabilized by a pair of opposed rollers 37, FIGURE 4, mounted on either end of the carriage in alignment with rollers 35 and adapted to roll in a pair of longitudinally extending grooves 38, FIGURE 2A, formed in the top and bottom surfaces of the track.

The controlled-velocity, reciprocatory movement is imparted to the carriage by means of the bell crank lever 9 pivotally connected to a reciprocating slide block 39 as at 40, FIGURE 3, the longer arm of the lever being connected to the carriage through a pin and slot connection 41; the smaller arm 9a of the lever is provided with a follower 42 adapted to ride in a suitably contoured groove 10a formed in the cam plate 10 secured to the frame 2. The slide block 39 is adapted to ride on a track 43 mounted on the frame beneath the cam plate, as shown in FIGURE 2A. Track 43 is similar in construction to the carriage track 4 and is provided with longitudinally extending grooves 43a, 43b and 43c, FIGURE 4, formed in the side, top and bottom edges thereof, respectively, to accommodate a roller 44 and opposed rollers 44′, respectively, mounted on the side of slide block 39. One end of a connecting rod 45, FIGURE 3, is pivotally connected as at 46 to the opposite side of the slide block, the opposite end of the connecting rod being connected to a crank arm 47 which is secured to the stub shaft 16.

By means of the construction and arrangement of the slide-crank mechanism 11, cam plate 10, and the bell crank lever 9 connected to the carriage 8, rotary motion of crank arm 47 will impart reciprocating motion to the slide block 39 which, in turn, will cause the carriage to reciprocate on the track 4; however, the carriage will not travel at the same velocity as the slide block 39, during certain portions of the travel of crank arm 47, due to the bell crank follower 42 riding in the cam groove 10a, thereby causing the lever to rock about the pivot 40. Thus, when the follower is positioned in the rise of the cam groove, the bell crank lever will rock in a counter-clockwise direction, as viewed in FIGURE 3, and thereby cause the carriage 8 to lead or move ahead of the slide block.

While the cam plate 10 has been shown with a contoured groove 10a, for purposes of explanation, it will be understood that the present invention comprehends the provision of interchangeable cam plates, each having a suitably contoured groove developed thereon, to provide any desired relative movement between the reciprocating carriage and slide block.

The above-described mechanism for effecting controlled velocity feed of the metallic sheets into the decorating press is an important feature of the present invention. As mentioned hereinbefore, mechanically controlled velocity, linear motion devices, usually employ sprocket driven roller chains to impart desired velocity to the work-moving mechanism. Since roller chain devices are subject to pulsation and elongation, particularly when driven at relatively high speeds, the use of roller chains is objectionable, in many applications. While the work-moving device of the present invention is particularly well suited for moving sheets into a decorating press, it will be understood that it is not limited to such use, for the reason it may be employed with other systems involving controlled velocity, linear motion arrangements.

To complete the structure of the conveyor assembly, an endless chain 48 carrying a pusher lug 49 is mounted on a pair of sprockets 50, FIGURES 2A and 3, rotatably secured to the frame 2, the chain 48 being driven by means of an endless chain 51 connected between a sprocket 52, which is secured to the same shaft which carries one of the sprockets 50 and another sprocket 53. The sprocket 53 is secured to one end of a shaft 54, FIGURE 2A, which is rotatably mounted in bearings 55 secured at each end of a hub portion 56 formed on the lower end of the frame 2, the opposite end of shaft 54 being connected to a gear 57 which meshes with the drive gear 12, FIGURE 1. A suitable chain tensioning mechanism 58, FIGURE 3, is provided at one end of frame 2 to vary the tension of the lug carrying chain 48, and an idler sprocket 59, carried by an arm 59a, is adjustably mounted on frame 2 by bolt and slot means 59b whereby the tension of drive chain 51 may be varied.

In order that the conveyor assembly may accommodate sheets of different widths, the frames 2 are slidably mounted on support rods 60 extending between the side frames 1a of the feed table, FIGURES 2A and 2B, movement of the frames 2, toward or away from each other, being accomplished by means of a pair of threaded rods 61, connected to the frames and extending between the side frames 1a of the feed table. This lateral adjustment mechanism is similar in construction to the mechanism shown and described in U.S. Patent No. 2,986,393, referred to hereinabove.

Figure 6A:
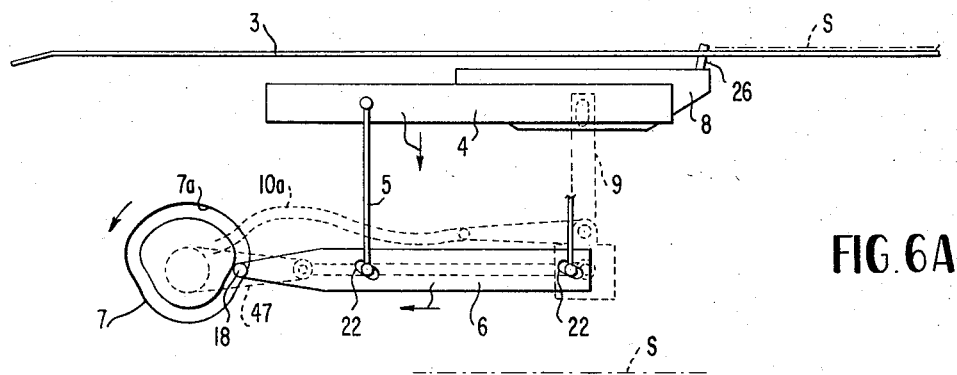
FIGURES 6A to 6D are schematic views showing the relative positions of the carriage track and associated work-moving carriage during the feeding of a metal sheet into the decorating press.
Figure 6B:
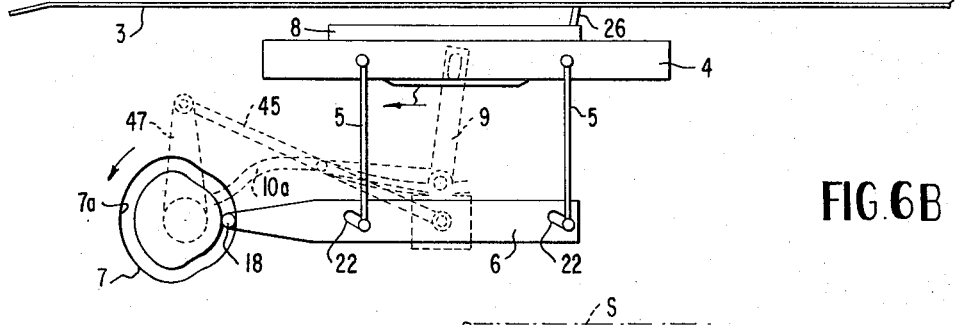
Figure 6C:
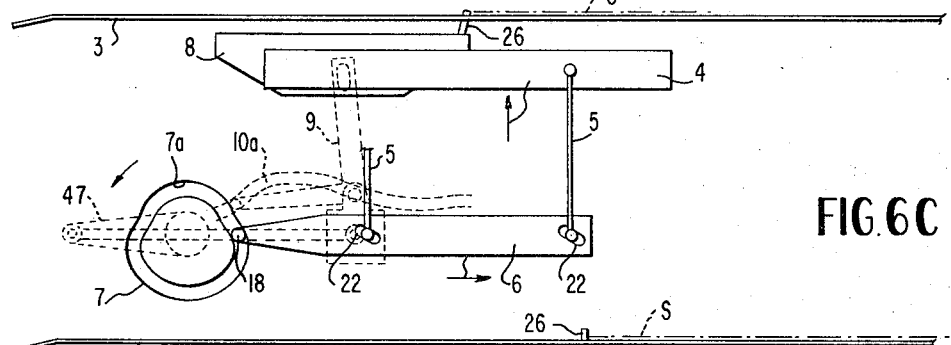
Figure 6D:
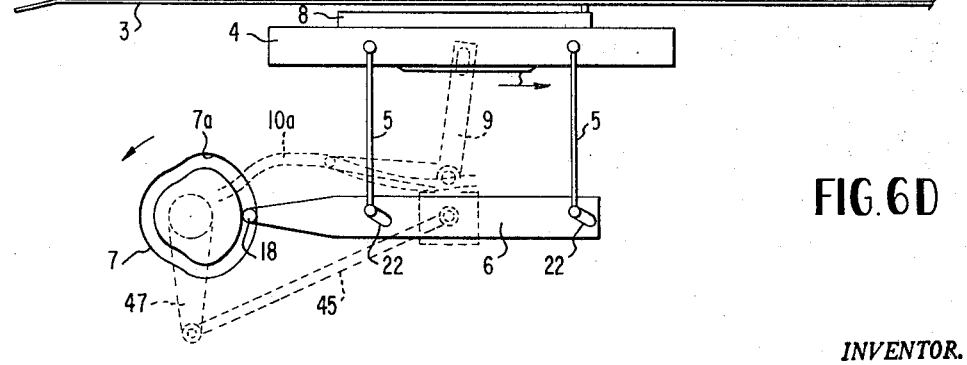

The operation of the conveyor assembly of the present invention is schematically illustrated in FIGURES 6A to 6D, wherein a sheet S, to be decorated, is fed onto the feed table slats 3 by means of a suitable feed device, not shown, whereupon the chain lugs 49, FIGURE 3, engage the trailing edge of the sheet and push it to a position, FIGURE 6B, preparatory to being engaged by the carriage lug 26; during this cycle of the operation, the track 4 and associated carriage 8 are positioned beneath the slats 3 to permit the sheet to clear the carriage pusher lugs 26. While the track remains in the retracted position, the crank arm 47 causes carriage 8 to slide rearwardly on the track until the carriage reaches the end of its stroke, whereupon, the cam 7 causes riser arm 6 to move forwardly, FIGURE 6C, thereby raising track 4 to its elevated position, whereby the carriage pusher lug 26 is in position to engage the trailing edge of the sheet. The slide-crank mechanism causes the carriage to slide forwardly on the track, FIGURE 6D, whereby the carriage pusher lug 26 engages the trailing edge of the sheet and pushes it into the decorating press, not shown, at a linear velocity corresponding to the peripheral velocity of the press cylinder. When the carriage reaches the end of its forward stroke, the cam 7 causes riser arm 6 to move rearwardly, FIGURE 6A, thereby causing track 4 to move into retracted position, while carriage 8 slides rearwardly on the track, preparatory to feeding the next succeeding sheet into the decorating press.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A conveyor assembly of the character described, comprising, work-moving carriage means, a slide-crank mechanism, lever means connecting said slide-crank mechanism to said carriage means for imparting reciprocatory movement to said carriage means, and cam means connected to said lever means, whereby the relative velocity of the carriage means with respect to the slide-crank mechanism may be varied.

2. A conveyor assembly according to claim 1, wherein the slide-crank mechanism comprises, a drive shaft, a crank arm having one end connected to one end of said drive shaft, a connecting rod having one end connected to the opposite end of said crank arm, and a slide block means connected to the opposite end of said connecting rod; the lever means comprising a bell-crank lever pivotally connected to the slide block means, the end of one of the arms of said bell-crank lever being connected to the carriage means and the end of the other arm of said bell crank lever being connected to said cam means.

3. A conveyor assembly according to claim 1, wherein track means is provided upon which the work-moving carriage means is slidably mounted for reciprocatory movement in a horizontal plane, cam means connected to riser arm means, and means connecting the riser arm means to the track means for reciprocating said track means and associated carriage means in a vertical plane.

4. A conveyor assembly according to claim 3, wherein the cam means comprises a rotary drive shaft, a cam secured to said drive shaft, said riser arm means comprising, a stationary track, an arm slidably mounted in said track, a cam follower secured to one end of said arm, said cam follower being connected to said cam, whereby the rotary movement of said drive shaft imparts horizontal, reciprocatory movement to said arm, the means for connecting said riser arm means to said track means comprising inclined surface means formed on said arm, and vertically extending rod means, the upper end of said vertically extending rod means being connected to said track means and the lower end of said rod means engaging the inclined surface means on the arm, whereby the horizontal reciprocatory movement of the arm causes the track means to reciprocate in a vertical plane.

5. A conveyor assembly according to claim 2, wherein a cam is secured to the opposite end of said drive shaft, a cam follower connected to said cam, an arm connected to said follower, a stationary track supporting said arm for horizontal reciprocatory movement therein, inclined surface means formed on said arm, track means positioned above said arm, said carriage means being slidably mounted on said track means for reciprocatory movement in a horizontal plane, and vertically extending rod means positioned between said track means and said arm, the upper end of said rod means being connected to said track means and the lower end of said rod means engaging the inclined surface means on said arm, whereby, the horizontal, reciprocatory movement of the arm causes the track means to reciprocate in a vertical plane while the carriage means simultaneously reciprocates in a horizontal plane on the track means.

6. A conveyor assembly of the character described for delivering metallic sheets into a metal decorating press comprising, a frame, a sprocket-driven endless chain mounted on said frame, pusher lugs carried by said chain, a rotary drive shaft mounted on said frame, cam means connected to one end of said drive shaft, a track secured to one side of said frame, riser arm means slidably mounted in said track, one end of said riser arm means being connected to said cam means, whereby the rotary motion of said drive shaft imparts horizontal reciprocatory movement to said riser arm means, inclined surface means formed on said riser arm means, track means positioned above the riser arm means in proximity to said sprocket-driven endless chain, vertically extending rod means connected between the track means and said riser arm means, the lower end of said vertically extending rod means engaging the inclined surface means on the riser arm means, whereby the horizontal reciprocatory movement of the riser arm means imparts a vertical reciprocatory movement to said track means, work-moving carriage means slidably mounted on said track means, a slide-crank mechanism connected to the opposite end of said drive shaft, lever means connecting said work-moving carriage means to said slide-crank mechanism, whereby horizontal reciprocatory movement is imparted to the carriage means, cam means connected to said lever means, whereby the relative velocity of the carriage means with respect to the slide-crank mechanism may be varied, and pusher lug means mounted on said carriage, whereby the pusher lugs on the endless chain engage the trailing edge of a sheet to be decorated and push the sheet into position where the carriage pusher lug means engage the trailing edge of the sheet and push said sheet the remaining distance into the decorating machine.

7. A conveyor assembly according to claim 6, wherein the slide-crank mechanism comprises, a crank arm having one end connected to said opposite end of said drive shaft, a stationary track secured to the opposite side of said frame, a slide-block slidably mounted in said stationary track, a connecting rod having one end connected to the opposite end of said crank arm, the opposite end of said connecting rod being connected to said slide-block, whereby the rotary movement of said drive shaft imparts horizontal reciprocatory movement to said slide-block, said lever means comprising a bell-crank lever pivotally connected to the slide-block means, the end of one of the arms of said bell-crank lever being connected to the carriage means and the end of the other arm of said bell-crank lever being connected to said cam means.

References Cited
UNITED STATES PATENTS 1,351,025   8/1920   Cooper _____ 198—106 X EDWARD A. SROKA, *Primary Examiner.*